United States Patent [19]

Paerisch et al.

[11] Patent Number: 4,709,959
[45] Date of Patent: Dec. 1, 1987

[54] SLIDING AND LIFTING ROOF

[75] Inventors: Jochen Paerisch, Herrenberg; Werner Herlemann, Aidlingen; Walter Schaetzler, Stockdorf/Gauting, all of Fed. Rep. of Germany

[73] Assignees: Webasto-Werk W. Baier GmbH & Co., Gauting; Daimler-Benz AG, Stuttgart, both of Fed. Rep. of Germany

[21] Appl. No.: 800,409

[22] Filed: Nov. 21, 1985

[30] Foreign Application Priority Data

Nov. 22, 1984 [DE] Fed. Rep. of Germany ....... 3442616

[51] Int. Cl.$^4$ .............................. B60J 7/22; B60J 7/05
[52] U.S. Cl. .................................... 296/217; 296/221; 296/222
[58] Field of Search ............... 296/216, 217, 218, 221, 296/222, 211; 160/40, 92, 96; 98/2.14, 2.15, 99.3, 99.4; 49/71

[56] References Cited

U.S. PATENT DOCUMENTS

| | | | |
|---|---|---|---|
| 4,018,476 | 4/1977 | Lutz et al. | 296/217 |
| 4,089,557 | 5/1978 | Leiter | 296/221 |
| 4,257,646 | 3/1981 | Schatzler | 296/222 |
| 4,522,115 | 6/1985 | Kelly et al. | 296/216 X |
| 4,553,307 | 11/1985 | Kaltz et al. | 296/222 X |
| 4,566,730 | 1/1986 | Knabe et al. | 296/221 |

FOREIGN PATENT DOCUMENTS 3012538 10/1981 Fed. Rep. of Germany .

*Primary Examiner*—Dennis H. Pedder
*Attorney, Agent, or Firm*—Sixbey, Friedman & Leedom

[57] ABSTRACT

Sliding and lifting roof for vehicles having a rigid cover, which in a closed position closes a roof opening in a fixed roof surface, and therefrom, can be selectively tilted upwardly so as to raise its rear edge above the fixed roof surface, or lowered and displaced below the fixed roof surface. A frame encircling at least part of the roof opening forms a rain gutter extending below both sides of the roof opening. Strip-shaped shield elements are attached at both sides of the cover, essentially perpendicular to the cover surface, and substantially flush with its lateral edges. The shield elements are flexible, at least in the area of their lower edges, and are fixedly connected with the cover along their upper edges. In the raised position of the cover, at least a major extent of the length of the shield elements will bear laterally against the lateral edges of the roof opening.

21 Claims, 5 Drawing Figures

SLIDING AND LIFTING ROOF

BACKGROUND AND SUMMARY OF THE INVENTION

The invention relates to a sliding and lifting roof for vehicles having a rigid cover, which in a closed position closes a roof opening in a fixed roof surface, and therefrom can selectively be either tilted so as to raise its rear end above the fixed roof surface, or lowered and slidably displaced below the fixed roof surface; having a frame which, at least partially, encircles the roof opening, which frame forms a rain gutter extending below both sides of the roof opening; and having strip-shaped shutter-like shield elements disposed at both sides of the roof, essentially perpendicular to the cover surface and substantially flush with the cover's edges.

In a known sliding lifting roof of this kind (German Offenleungsschrift No. 23 19 063; U.S. Pat. No. 4,089,557), shutter elements are pivotable about a horizontal axis near the forward edge of the cover and their rear ends are downwardly spring biased. In the raised cover position, the tilting action of the shutter elements is determined by an abutment which is connected with the cover. In the closed position of the cover, and when the cover's rear edge is lowered, the rearward shutter end rests on the bottom of the rain gutter, and the shutter elements are lifted off their abutment, against the spring force. The shutters have the function to suppress the inflow of air and related noises at the sides of the cover, when the cover is in its tilted position. The known arrangement has the disadvantage of requiring increased drive power, as the springs for the biasing of the shutter elements have to be of rather sturdy construction in order to suppress the vibration and rattling noises of the shutter elements. As a consequence, the shutter elements are quite forcefully pressed against the bottom of the rain gutter when the cover is lowered, causing significantly more friction force in the displacement of the cover and resulting in wear at the point of contact between the shutter elements and the rain gutter, as well as grinding noises during the cover's displacement.

It is a primary object of the present invention, therefore, to provide a sliding and lifting roof of the kind mentioned, in which the lateral gap between the sides edges of the roof opening and the cover, when the cover is in a tilted position, is effectively sealed without incurring substantially additional friction force in the displacement of the cover.

This objective is achieved, in accordance with preferred embodiments of the invention, in that at least a lower edge portion of shutter-like shield elements are formed of a flexible construction, an upper edge of the shutter elements is fixedly connected with the cover, and in that the shutter-like shield elements, at least with a major portion of their length, laterally bear against the edge of the roof opening, when the cover is tilted.

The design of the invention eliminates the need for biasing springs, which can cause additional frictional force when the cover is displaced. Notwithstanding, an effective lateral sealing is achieved. The flexible shield element is not apt to cause rattling noises, even when positioned at the edge of the roof opening. The flexible construction of at least the lower edge portion of the shield elements permits a relatively wide selection of the height of the shield elements. For instance, the shield element may be of a height such that its rear zone touches the bottom of the rain gutter, in which case it is deflected. Preferably, however, the height of the shield elements is dimensioned such as to keep them at a slight distance above the bottom of the rain gutter when the rear edge of the cover is lowered. It is an advantageous feature of such a design that problems are not encountered when, on the basis of tolerances of manufacture and/or installation, the shield elements, with a correctly vertically adjusted cover, happen to contact the bottom of the rain gutter, when the rear edge of the cover is lowered.

Advantageously, the flexible portion of each shield element consists of a flat strip made of rubber or synthetic material. In order to ensure an even better seal when the cover is in its tilted position, the upper portion of the shield element can be of rigid design. Preferably, the fastening means supporting the shield elements are attached on both sides of the underside of the cover. Such fastening means may extend over part of the vertical height of the shield element, which shield element can be affixed exteriorly to the fastening means. In a further development of the invention, in order to seal the lateral gap over the largest possible area, without having the shield elements in the rear segment touch the bottom of the raingutter, the lower edge of the shield element, in the rear area of the longitudinal extent of the shield element is inclined, relative to the lateral edge of the cover, so that it is essentially parallel to the bottom of the rain gutter, when the rear edge of the cover is lowered.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 3 and 4 are cross-sectional views corresponding to FIG. 2 with the cover closed, and with the cover rear edge lowered, respectively, wherein FIG. 3 shows a transparent cover.

DETAILED DESCRIPTION OF THE PREFERRED EMBODIMENTS

Figure 1:
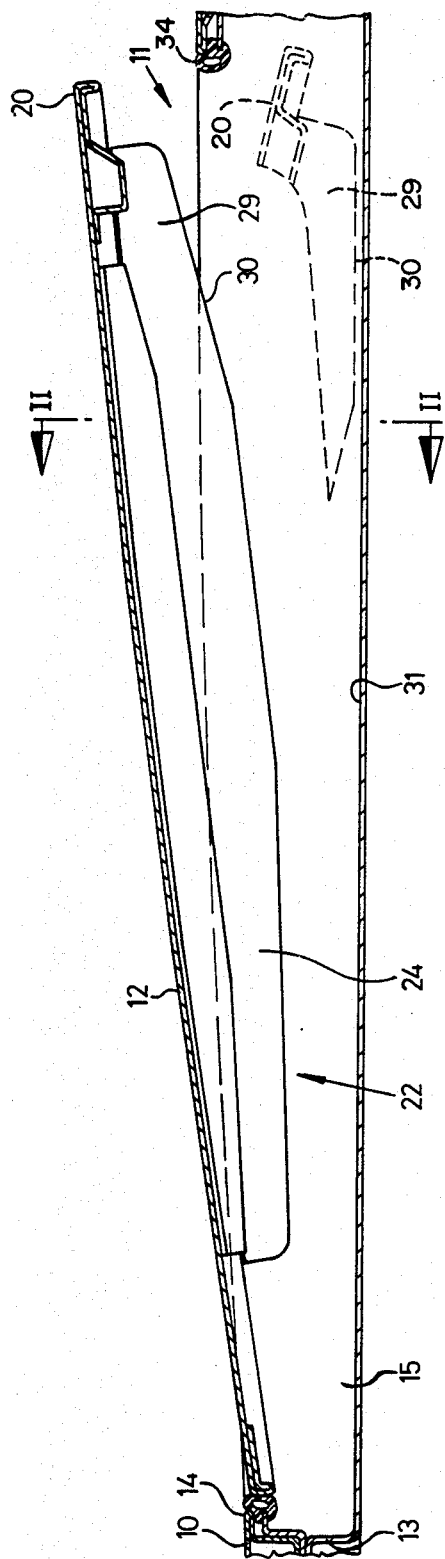
FIG. 1 is a schematic longitudinal section through a sliding and lifting roof according to the invention when the cover is raised.
Figure 2:
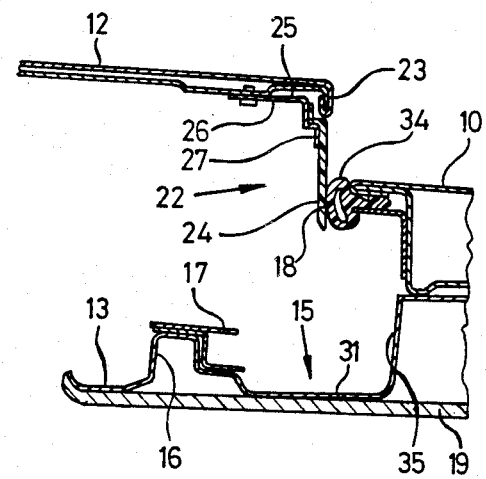
FIG. 2 is a partial cross section along lines II—II of FIG. 1.
Figure 3:
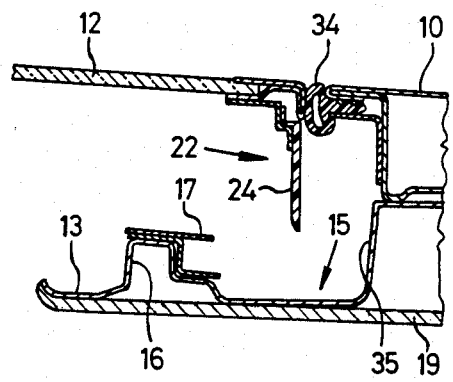

As shown in FIGS. 1 and 2, a roof opening 11 is provided in a fixed roof surface 10, which opening can be selectively closed, or at least partially opened, by a rigid cover 12. As indicated in FIG. 3, the cover may be made of transparent or translucent material, particularly glass or synthetic material. The cover, however, may also be made of sheet metal (remaining figures).

The roof opening 11 is encircled by a roof frame 13, which forms a rain gutter 15 along the forward edge 14, and at both sides of the roof opening. At the side of the gutter closest to roof opening 11, frame 13 has an arch 16 which constitutes the inner wall of the rain gutter, at which wall, along each longitudinal side of the roof opening, a respective guide rail 17 is secured so as to extend in the longitudinal direction of the vehicle, parallel to the side edge 18 of roof opening 11. Roof frame 13 is covered by roof liner 19 from below. Guide rails 17 and the remaining elements of the sliding and lifting roof are essentially arranged in mirror image symmetry to a central longitudinal axis of opening 11. Accordingly, a description of the construction and function of only one side of the assembly is necessary and is presented.

Cover 12 is mounted for movement along each guide rail 17 by a slidable guide member near the forward end of each side of the cover in a known manner (German Offenlegunsschrift No. 32 18 454 corresponding to U. S. Application Ser. No. 530,716 now U.S. Pat No. 4,566,730) and is pivotally supported for movement about a pivot axis which extends transversely to the direction of cover displacement. Such an axis, for instance, could be formed by the forward guide elements. In an area which is rearward of the cover's forward edge, and spaced apart therefrom, a lifting mechanism connects cover 12 with at least one drive member, which is adjustable in the direction of cover displacement. By displacement of the drive member, rear edge 20 of the cover can be tilted upwardly above the fixed roof surface 10 (FIGS. 1 and 2), or can be lowered (FIG. 4) and displaced below the fixed roof surface.

At each side of cover 12 there is a strip-shaped shield element 22, that is oriented essentially perpendicular to the cover surface, and substantially flush with the cover lateral edge 23. In the illustrated embodiment, shield element 22 is comprised of rubber of similarly flexible synthetic plastic strip 24 which is secured to cover 12 by a fastening element 25 which extends along a segment of the longitudinal extent of the shield element 22 (FIG. 1). An essentially horizontal leg 26 of fastening element 25 is mounted at the underside of cover 12, while a dependent leg 27 of fastening element 25 projects downwardly therefrom and engages an upper portion of the shield element 22, rendering it rigid, even if the entire strip 24 has a flexible nature. Strip 24 is attached at the exterior of leg 27, for example, by being glued.

Figure 4:
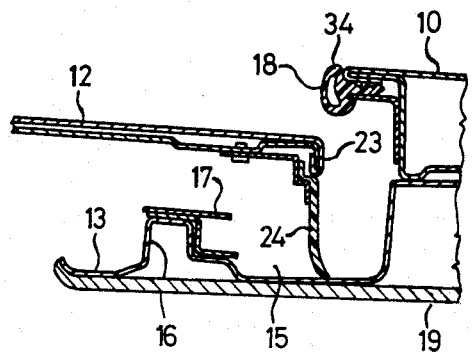

A rear portion 29 of the longitudinal extent of shield element 22 is provided with a lower edge 30 that has an inclined configuration relative to lateral edge 23 of cover 12, so that it will be essentially parallel to bottom 31 of rain gutter 15 when the rear edge 20 of the cover is lowered into a position for sliding retraction of cover 12 (FIG. 4).

In the embodiment according to FIGS. 1 to 4, lateral edge 18 of roof opening 11 is formed by seal 34. In the closed cover position, seal 34 engages lateral edge 23 of cover 12 (FIG. 3). In the tilted cover position (FIGS. 1 and 2), shield element 22 laterally bears on seal 34.

Preferably, the height of shield element 22 is such that it is kept at a distance from bottom 31 of rain gutter 15, even when rear edge 20 of the cover is in a lowered position. If, however, tolerances of manufacture of installation result in shield element 22 seating on rain gutter bottom 31, no adverse effects are caused because flexible strip 24 will either bend or be deflected laterally at its bottom edge portion as depicted in FIG. 4. In a similar manner, the lower edge of the shield element could seat itelf on the guide elements or members of the raising mechanism of the cover, without causing problems. Furthermore, the strip-shaped shield element 22 requires only a minimum of space in a transverse direction. In practice, this is frequently of crucial importance as the cover guide and operating elements (not depicted) must be accommodated in the area between guide rails 17 and outer wall 35 of rain gutter 15.

Figure 5:
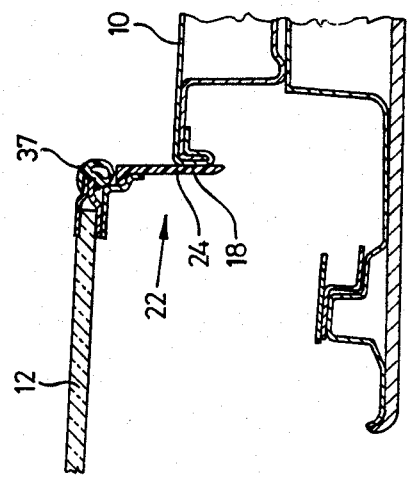
FIG. 5 is a cross-sectional view similar to FIG. 2 showing a modified form of the invention.

In a modification of the invention, in accordance with FIG. 5, seal 37, corresponding to seal 34, is secured to the cover and forms its lateral edge 23. Shutter 22 is essentially laterally flush with the outer surface of seal 37. In this way, in the modified form of the invention, it is also assured that shutter element 22 rests sealingly against side edge 18 of roof opening 11 when the cover is tilted, because its lateral position assures that it will snuggly fit against edge 18 of the roof opening, being inwardly deflected thereby in a manner similar to the compression applied to seal 37 when it seats against edge 18 in the closed position of cover 12.

It is understood that the invention is not limited to the preferred embodiments discussed. For instance, leg 27 of fastening element 25 may extend further downward in order to reinforce a greater extent of the upper portion of the shield element. Here, also, it is essential that the lower edge area of the shutter remains flexible. Basically, it is possible to fashion shield element of a flexible material, like rubber or synthetic material, either in its entirety or only at its lower portion. Similarly, other modifications will be apparent to those of ordinary skill in the art so that the present invention should not be viewed as limited solely to the arrangements set forth above, but rather, is intended to encompass the full scope of the claims as appended hereto.

We claim:

1. Sliding and lifting roof for vehicles of the type having a rigid cover, which in a closed position closes a roof opening in a fixed roof surface, and therefrom, is selectively tiltable upwardly so as to raise a rear edge of the cover above the fixed roof surface, and lowerable for sliding displacement below the fixed roof surface, comprising a frame encircling at least part of the roof opening, said frame forming a rain gutter extending below opposite sides of the roof opening; and a strip-shaped shield element arranged at each of said sides of the cover so as to be essentially normal to the cover surface and substantially flush with its edge, wherein a lower portion of each shield element is of a material sufficiently flexible to deform upon contact with said gutter or other fixed structure of the roof and the shield elements are fixedly connected with the cover along upper edges thereof, and wherein at least a major portion of a longitudinal extent of each lower portion laterally bears against a respective side edge of the roof opening when the cover is tilted upwardly, and wherein the flexible portion of each strip-shaped shield element is an extension of the strip-shaped shield element that is disposed so as to extend parallel to a plane within which the shield element is displaceable.

2. Sliding and lifting roof according to claim 1, wherein the height of the shield elements is dimensioned such that the shield elements are situated a small distance above a bottom wall of the rain gutter, when the rear edge of the cover is lowered into a position for sliding displacement.

3. Sliding and lifting roof according to claim 2, wherein the flexible portion of each shield element consists of a flat strip of rubber or synthetic plastic material.

4. Sliding and lifting roof according to claim 1, wherein the flexible portion of each shield element consists of a flat strip of rubber or synthetic plastic material.

5. Sliding and lifting roof according to claim 1, wherein an upper portion of each shield element is rigid.

6. Sliding and lifting roof according to claim 2, wherein an upper portion of each shield element is rigid.

7. Sliding and lifting roof according to claim 1, wherein a fastening element for the shield element is attached to the underside of the cover at both sides thereof.

8. Sliding and lifting roof according to claim 5, wherein a fastening element for the shield element is attached to the underside of the cover at both sides thereof.

9. Sliding and lifting roof according to claim 8, wherein the fastening element extends along only a segment of the longitudinal extent of the shield element and in that the shield element is secured on a laterally exterior side of the fastening element.

10. Sliding and lifting roof according to claim 9, wherein a rear segment of the longitudinal extent of the shield element has a lower edge that extends obliquely relative to a respective lateral edge of the cover, such that it is in essentially parallel alignment with the bottom of the rain gutter, when the rear edge of the cover of in its lowered position.

11. Sliding and lifting roof according to claim 2, wherein a rear segment of the longitudinal extent of the shield element has a lower edge that extends obliquely relative to a respective lateral edge of the cover, such that it is in essentially parallel alignment with the bottom of the rain gutter, when the rear edge of the cover in its lowered position.

12. Sliding and lifting roof according to claim 4, wherein a fastening element for the shield element is attached to the underside of the cover at both sides thereof.

13. Sliding and lifting roof according to claim 4, wherein the fastening element extends along only a segment of the longitudinal extent of the shield element and in that the shield element is secured on a laterally exterior side of the fastening element.

14. Sliding and lifting roof according to claim 12, wherein a rear segment of the longitudinal extent of the shield element has a lower edge that extends obliquely relative to a respective lateral edge of the cover, such that it is in essentially parallel alignment with the bottom of the rain gutter, when the rear edge of the cover in its lowered position.

15. Sliding and lifting roof according to claim 3, wherein a fastening element for the shield element is attached to the underside of the cover at both sides thereof.

16. Sliding and lifting roof according to claim 15, wherein the fastening element extends along only a segment of the longitudinal extent of the shield element and in that the shield element is secured on a laterally exterior side of the fastening element.

17. Sliding and lifting roof according to claim 15, wherein a rear segment of the longitudinal extent of the shield element has a lower edge that extends obliquely relative to a respective lateral edge of the cover, such that it is in essentially parallel alignment with the bottom of the rain gutter, when the rear edge of the cover in its lowered position.

18. Sliding and lifting roof according to claim 3, wherein a rear segment of the longitudinal extent of the shield element has a lower edge that extends obliquely relative to a respective lateral edge of the cover, such that it is in essentially parallel alignment with the bottom of the rain gutter, when the rear edge of the cover in its lowered position.

19. Sliding and lifting roof according to claim 1, wherein a rear segment of the longitudinal extent of the shield element has a lower edge that extends obliquely relative to a respective lateral edge of the cover, such that it is in essentially parallel alignment with the bottom of the rain gutter, when the rear edge of the cover in its lowered position.

20. Sliding and lifting roof according to claim 1, wherein the entirety of each shield element is comprised of a flat strip of elastically flexible material.

21. Sliding and lifting roof according to claim 20, wherein an upper portion of each shield element is rendered relatively rigid by a fastening element for attachment thereof to the cover.

* * * * *